(12) United States Patent
Tatum et al.

(10) Patent No.: US 7,357,371 B2
(45) Date of Patent: Apr. 15, 2008

(54) ISOLATION VALVE SEAL

(75) Inventors: Gary Allen Tatum, Houston, TX (US);
Thomas Henry Loga, Sugar Land, TX (US)

(73) Assignee: Daniel Industries, Inc., Houston, TX (US)

( * ) Notice: Subject to any disclaimer, the term of this patent is extended or adjusted under 35 U.S.C. 154(b) by 26 days.

(21) Appl. No.: 11/278,441

(22) Filed: Apr. 3, 2006

(65) Prior Publication Data

US 2007/0228316 A1  Oct. 4, 2007

(51) Int. Cl.
*F16K 1/16* (2006.01)

(52) U.S. Cl. .................. 251/301; 251/326; 251/333

(58) Field of Classification Search ........... 251/298, 251/300, 301, 326, 329, 333
See application file for complete search history.

(56) References Cited

U.S. PATENT DOCUMENTS

| | | | | |
|---|---|---|---|---|
| 593,567 | A | * 11/1897 | Crane et al. ............... 251/77 |
| 3,109,624 | A | * 11/1963 | Edwarde ................. 251/329 |
| 3,514,076 | A | * 5/1970 | Wheatley ................. 251/261 |
| 5,205,532 | A | * 4/1993 | Naehring ................... 251/85 |
| 5,836,356 | A | * 11/1998 | Desai ........................ 138/44 |
| 5,967,166 | A | * 10/1999 | Carter ......................... 137/1 |
| 6,619,618 | B2 | 9/2003 | Ishigaki et al. |
| 6,698,719 | B2 | * 3/2004 | Geiser ...................... 251/332 |
| 6,871,666 | B1 | 3/2005 | Loga et al. |
| 2005/0258389 | A1 | 11/2005 | Loga |

OTHER PUBLICATIONS

Written Opinion and International Search Report for Appl. No. PCt/US2007/064939 dated Nov. 28, 2007 (6 p.).

* cited by examiner

*Primary Examiner*—John K. Fristoe, Jr.
(74) *Attorney, Agent, or Firm*—Conley Rose, P.C.

(57) ABSTRACT

Methods and apparatus for sealing an aperture that provides fluid communication between a second and first chamber of a dual chamber orifice fitting. A sealing assembly comprises a closure member that is rotatably moveable between an open and closed position relative to the aperture. A secondary seal is disposed within a recessed portion on a sealing face of the closure member. The recessed portion has a perimeter defined by a shoulder A primary seal is disposed within a groove formed between the shoulder and the secondary seal.

21 Claims, 3 Drawing Sheets

ISOLATION VALVE SEAL

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The invention relates to methods and apparatus for sealing an aperture More particularly, the present invention relates to methods and apparatus for sealing the aperture located between the first and second chambers of a dual chamber orifice fitting.

In pipeline operations and other industrial applications, flow meters are used to measure the volumetric flow rate of a gaseous or liquid flow stream moving through a piping section. Flow meters are available in many different forms. One type of flow meter is an orifice meter, which includes an orifice fitting connected to the piping section The orifice fitting serves to orient and support an orifice plate that extends across the piping section perpendicular to the direction of flow stream. The orifice plate is a thin plate that includes a circular opening, or orifice, that is positioned within the flow stream.

In operation, when the flow stream moving through the piping section reaches the orifice plate, the flow is forced through the orifice, thereby constricting the cross-sectional area of the flow. Due to the principles of continuity and conservation of energy, the velocity of the flow increases as the stream moves through the orifice. This velocity increase creates a pressure differential across the orifice plate The measured differential pressure across the orifice plate can be used to calculate the volumetric flow rate of the flow stream moving through the piping section.

A dual chamber orifice fitting enables the orifice plate to be removed from the fitting without interrupting the flow stream moving through the piping section. In many designs, this is achieved by providing two chambers within the fitting wherein the orifice plate is in the flow streams in one chamber and out of the flow stream in the second chamber An isolation valve is provided between the two chambers so as to prevent fluid communication between the two chambers when the valve is closed but also allow the orifice plate to pass between the chambers when the valve is open.

The isolation valves can be any of various devices that regulate the flow Of gases or liquids through the pipeline, piping or through related apertures by opening, closing, or obstructing ports or passageways. Many isolation valves comprise a stainless steel valve strip, or rectangular bar, which is manipulated by a valve carrier engaged with a drive mechanism such as a rack and pinion gear. The valve strip covers the aperture between the lower and second chambers and is biased against the aperture by springs and by the pressure of the fluid in the pipeline and first chamber.

In many instances, a chemical or petroleum based lubricant is injected between the valve strip and a seat surrounding the aperture. This lubricant acts to effectuate a seal along the interface between the valve strip and the seat. The performance of the seal is dependent on the dynamic viscosity of the lubricant If the fluid pressure differential across the seal exceeds the dynamic viscosity of the lubricant, the lubricant will shear and the seal will fail. Additionally, many lubricants are susceptible to degradation over time that can also result in leakage and failure of the seal.

Thus, the embodiments of the present invention are directed to apparatus and methods for sealing the aperture located between the first and second chambers of an orifice fitting that seek to overcome these and other limitations of the prior art.

SUMMARY OF THE PREFERRED EMBODIMENTS

Embodiments of the present invention include methods and apparatus for sealing an aperture that provides fluid communication between an second and first chamber of a dual chamber orifice fitting. A valve assembly comprises a closure member that is rotatably moveable between an open and closed position relative to the aperture. A secondary seal is disposed within a recessed portion on a sealing face of the closure member. The recessed portion has a perimeter defined by a shoulder. A primary seal is disposed within a groove formed between the shoulder and the secondary seal.

In some embodiments, a dual chamber orifice fitting comprises a body having a first chamber disposed therein and a top coupled to the body and having a second chamber disposed therein. An aperture provides fluid communication between the body and the top. A closure member is rotatably moveable between an open and closed position relative to the aperture. A seal assembly seals across the aperture when the closure member is in the closed position. The seal assembly comprises a primary seal and a secondary seal.

Thus, the embodiments of present invention comprise a combination of features and advantages that enable substantial enhancement of the sealing of valves used in dual chamber orifice fittings. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

Figure 1:
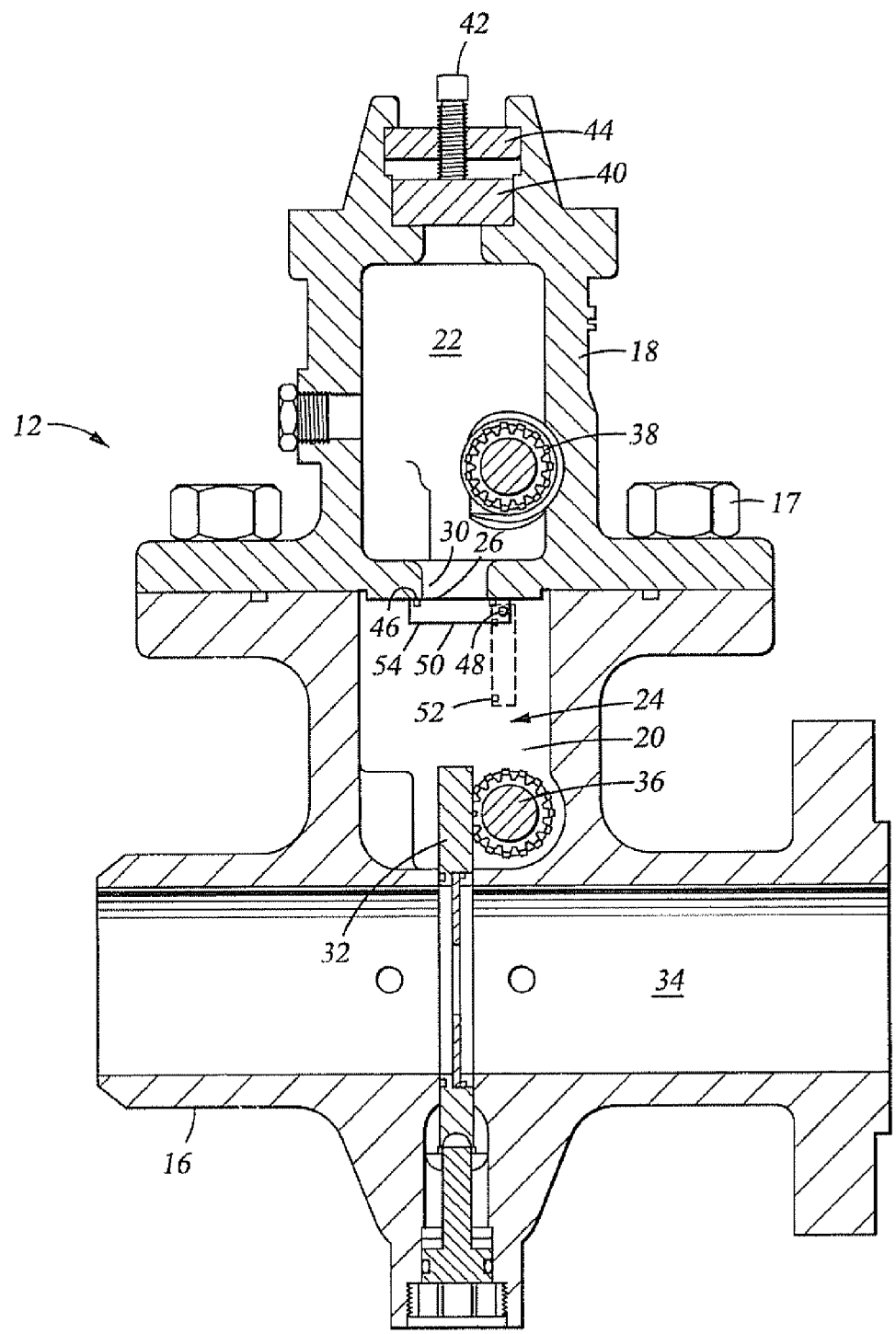
FIG. 1 is a cross-sectional view of a dual chamber orifice fitting comprising a seal assembly constructed in accordance with embodiments of the present invention.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Referring now to FIG. 1, dual chamber orifice fitting 12 includes body 16 and top 18. Body 16 encloses first chamber 20 which is in fluid communication with the interior 34 of a pipeline. Top 18 encloses second chamber 22 and is connected to body 16 by connection members 17. Aperture 30 defines an opening connecting second chamber 22 to first chamber 20. Valve assembly 54 is mounted within body 16 and is rotatable about hinge pin 48 between closed position 50 and open position 52 so as to selectively close aperture 30. Seal assembly 46 sealingly engages seat 26 when valve assembly 54 is in closed position 50. First drive 36 and second drive 38 operate to move orifice plate carrier 32 vertically within fitting 12. Clamping bar screws 42 and clamping bar 44 retain sealing bar 40 in engagement with top 18.

FIG. 1 shows orifice plate carrier 32 in a metering position in alignment with bore 34. In order to remove orifice plate carrier 32 from fitting, pivoting closure member 24 must be opened so that the plate carrier can be moved into second chamber 22 through aperture 30. Once pivoting closure member 24 is opened, first drive 36 is actuated to move orifice plate carrier 32 upwards through aperture 30 into second chamber 22. Once orifice plate carrier 32 is entirely within second chamber 22, pivoting closure member 24 is closed to isolate the second chamber from bore 34 and first chamber 20. Any pressure within second chamber 20 can then be relieved and orifice plate carrier 32 can be removed from fitting 12 by loosening clamping bar screws 64 and removing clamping bar 44 and sealing bar 40 from top 18.

Valve assembly 54 is moved between closed position 50 and open position 52 by an actuation system (not shown). When in closed position 50, valve assembly 54 is urged toward seat 26 by the actuation system so as to compress seal 46 between the valve assembly and the seat. The compression of seal 46 effectuates a low pressure seal across aperture 30. As differential pressure across seal 46 increases, the compression forces on the seal also increase, which increases the sealing ability of the seal.

Figure 2:
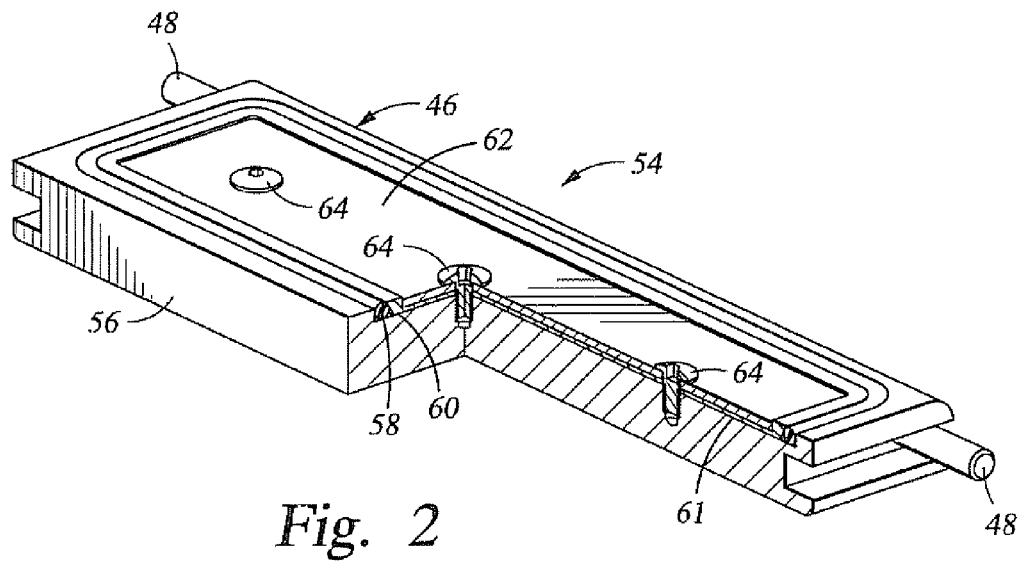
FIG. 2 is a partial sectional view of a closure member comprising a seal assembly constructed in accordance with embodiments of the present invention.
Figure 3:
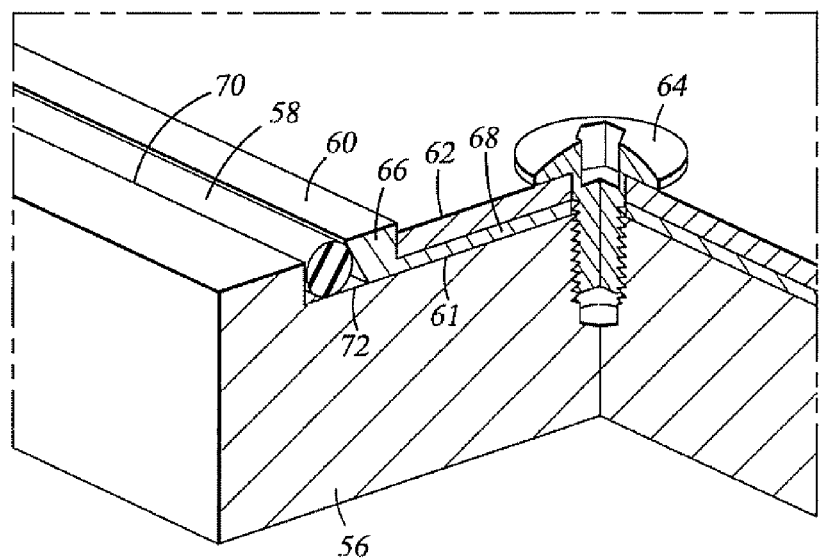
FIG. 3 is a detailed view of the seal assembly of FIG. 2.

Referring now to FIGS. 2 and 3, valve assembly 54 comprises rotating closure member 56, hinge pin 48, seal assembly 46, and retainer plate 62. Hinge pins 48 project from opposing ends of closure member 56. Closure member 56 further comprises recessed portion 61, the perimeter of which is defined by shoulder 70. Seal assembly 46 is mounted within recessed portion 61 and forms a substantially rectangular perimeter sized so as to entirely surround the aperture being sealed. Seal assembly 46 is shown having a substantially rectangular perimeter but may also be constructed in other shapes as may be necessary depending on the arrangement of the aperture and seat.

Seal assembly 46 comprises primary seal 58 and secondary seal 60. Primary seal 58 is a resilient seal that will deform under compression loads. Secondary seal 60 comprises sealing flange 66 that surrounds a comparatively thin flat portion 68. Flat portion 68 is disposed between closure member 56 and retainer plate 62. Fasteners 64 couple to closure member 56 so as to fix retainer plate 62 and secondary seal 60 relative to the closure member In general, primary seal 58 is constructed from a resilient material that is suitable for low pressure sealing applications while secondary seal 60 is constructed from a less resilient material that helps support the primary seal and provides high pressure sealing.

Groove 72 is formed between sealing flange 66 and shoulder 70 of closure member 56. Primary seal 58 is substantially disposed within groove 72. A portion of primary seal 58 projects out of groove 72 so as to provide the initial sealing interface with seat 26. Groove 72 is illustrated with shoulder 70 being substantially perpendicular to closure member 56 and sealing flange 66 having an outer profile that is not parallel with the shoulder In certain embodiments, shoulder 70 and sealing flange 66 may be inclined so that groove 72 is a dove-tailed groove. In some embodiments sealing flange 66 may have a concave shape that acts to securely capture primary seal 58. In other embodiments, shoulder 70 and sealing flange 66 may be parallel so that groove 72 has a rectangular cross-section.

Figure 4:
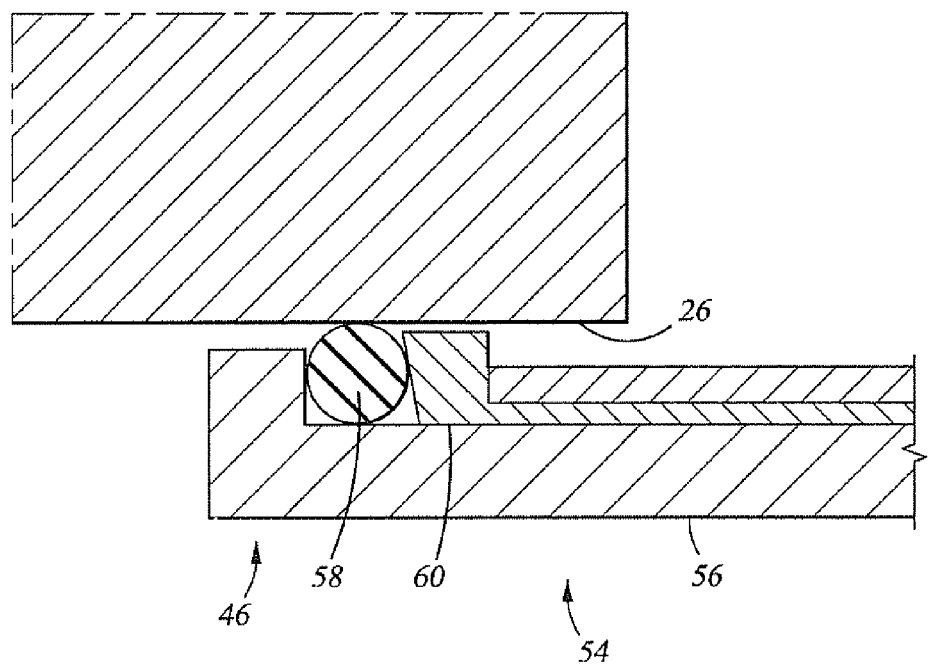
FIG. 4 is a sectional view of the seal assembly of FIG. 2 in a low pressure sealing position.

FIG. 4 illustrates valve assembly 54 in a low pressure closed position. In the low pressure closed position, seal 46 projects from groove 72 and is engaged with seat 26. At low pressures and closing forces, primary seal 58 is compressed between seat 26 and closure member 56. Groove 72 limits that expansion of primary seal 58 and forms a seal with seat 26. Secondary seal 60 serves to support and limit the deformation of primary seal 58 and may or may not be in contact with seat 26.

Figure 5:
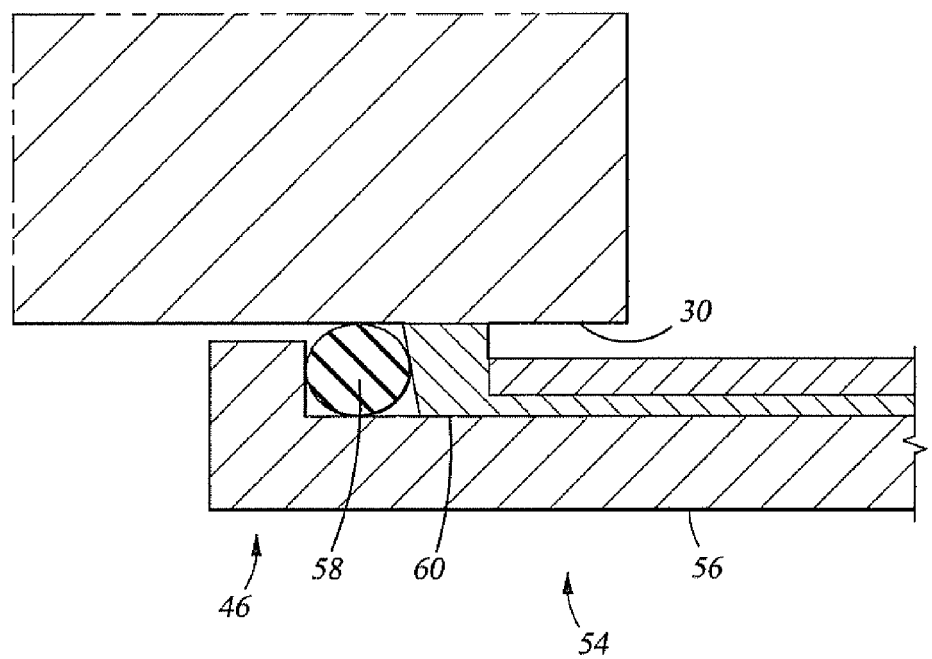
FIG. 5 is a sectional view of the seal assembly of FIG. 2 in a high pressure sealing position.

As differential pressure across valve assembly 54 increases, closure member, 56 is pushed closer to seat 26. As the gap between closure member 56 and seat 26 decreases, primary seal 58 further compresses. As the gap decreases, secondary seal 60 also contacts and sealingly engages seat 26, as is shown in FIG. 5. Under higher pressure loads, both primary seal 58 and secondary seal 60 sealingly engage seat 60. Secondary seal 60 supports primary seal 58 while retainer plate 62 helps to prevent the collapse, or creep, of the secondary seal.

Primary seal 58 is illustrated as having a circular cross-section but may have any desired cross-sectional shape. Primary seal 58 may be constructed from an elastomeric material or any other resilient material having desirable properties. Primary seal 58 may be a circular o-ring that is conformed to the illustrated rectangular shape of groove 72 or may be molded to have the desired shape.

Secondary seal 60 is constructed of a less resilient material than primary seal 58 so that the secondary seal helps to retain and provide reinforcement of the primary seal. In certain embodiments, secondary seal 60 is constructed from a polymeric material, such as polytetraflouroethylene (PTFE).

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A valve assembly comprising:
   a closure member rotatably moveable between an open and closed position relative to an aperture that provides fluid communication between a second and a first chamber of a dual chamber orifice fitting;
   a secondary seal disposed within a recess formed on a sealing face of said closure member, wherein the recess has a perimeter defined by a shoulder, wherein the secondary seal comprises a flat portion and a sealing flange disposed along the outer periphery of the flat portion;

a primary seal disposed within a groove formed between said shoulder and said secondary seal; and a retainer plate coupled to the closure member wherein the sealing flange is disposed between the primary seal and the retaining plate.

2. The sealing assembly of claim 1 wherein said primary seal is constructed from a resilient material.

3. The sealing assembly of claim 2 wherein said secondary seal is less resilient than the primary seal.

4. The sealing assembly of claim 1 wherein said primary seal has a circular cross-section.

5. The sealing assembly of claim 1, wherein the flat portion of said secondary seal is disposed between said retainer plate and said closure member.

6. The sealing assembly of claim 5 wherein sealing flange of the secondary seal forms the groove with the shoulder.

7. The sealing assembly of claim 1 wherein said sealing flange has an outer profile that is not parallel to the shoulder.

8. The valve assembly of claim 1 wherein the fiat portion of the secondary seal extends to a first height measured perpendicularly flour the lower recess surface, and the sealing flange extends to a second height measured perpendicularly from the lower recessed surface, wherein the second height is greater than the first height.

9. The valve assembly of claim 1 wherein the sealing flange extends perpendicularly from the tipper surface of the flat portion.

10. The valve assembly of claim 1 wherein the primary seal is disposed about the secondary seal such that the primary seal circumscribes the secondary seal.

11. A dual chamber orifice fitting comprising:

a body having a first chamber disposed therein;

a top coupled to said body and having an second chamber disposed therein;

an aperture that provides fluid communication between said body and said top;

a closure member rotatably moveable between an open and closed position relative to said aperture;

a seal assembly that seals across said aperture when said closure member is in the closed position, wherein said seal assembly comprises a primary seal and a secondary seal, the secondary seal including a flat portion and a sealing flange along the outer periphery of the flat portion;

a retainer plate coupled to said closure member, wherein the retainer plate includes an upper surface, a lower surface, and side surfaces extending therebetween:

wherein the flat portion of the secondary seal is disposed between the retainer plate and the closure member, and the sealing flange of the secondary seal extends along the side surfaces of the retainer plate.

12. The dual chamber orifice fitting of claim 11 wherein said primary seal is constructed from a resilient material.

13. The dual chamber orifice fitting of claim 12 wherein said secondary seal is less resilient than the primary seal.

14. The dual chamber orifice fitting of claim 11 wherein said secondary seal is disposed within a recessed portion on a sealing face of said closure member; wherein the recessed portion has a perimeter defined by a shoulder.

15. The dual chamber orifice fitting of claim 14 wherein said primary seal is disposed within a groove formed between the shoulder and said secondary seal.

16. The dual chamber orifice fitting of claim 15 wherein said sealing flange forms the groove with the shoulder.

17. The dual chamber orifice fitting of claim 16 wherein said sealing flange has an outer profile that is not parallel to the shoulder.

18. The valve assembly of claim 14 wherein the primary seal is disposed between the shoulder and the sealing flange of the secondary seal, and wherein the sealing flange of the secondary seal is disposed between the retaining plate and the primary seal.

19. A method comprising:

positioning a secondary seal in a recess provided in a sealing face of a closure member, wherein the secondary seal includes an inner flat portion and a sealing flange disposed along outer periphery of the flat portion;

positioning a primary seal in the recess around the secondary seal such that the primary seal circumscribes the secondary seal;

rotating the closure member from an open position to a closed position contacting a seat, wherein in the closed position the closure member is disposed across an aperture that provides fluid communication between an second and first chamber of a dual chamber orifice fitting; and compressing a primary seal between the closure member and the seat so as to isolate the second chamber from the first chamber, wherein said primary seal is supported by the secondary seal wherein the recess has a perimeter defined by a shoulder, and wherein the primary seal is disposed within a groove formed between the shoulder and the secondary seal; and further comprising coupling a retainer plate to the closure member with the flat portion of said secondary seal being disposed between the retainer plate and the closure member.

20. The method of claim 19 further comprising compressing the sealing flange of the secondary seal between the closure member and the seat.

21. The method of claim 19 wherein the primary seal is constructed from a resilient material and the secondary seal is less resilient than the primary seal.

* * * * *